United States Patent
Koo et al.

(10) Patent No.: US 11,763,771 B2
(45) Date of Patent: Sep. 19, 2023

(54) SINK DEVICE WITH VARIABLE FRAME RATE AND DISPLAY DEVICE INCLUDING THE SAME

(71) Applicant: SAMSUNG DISPLAY CO., LTD., Yongin-si (KR)

(72) Inventors: Jahun Koo, Asan-si (KR); Kyung-Hun Lee, Yongin-si (KR); Ho Lee, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/151,313

(22) Filed: Jan. 18, 2021

(65) Prior Publication Data

US 2021/0142758 A1 May 13, 2021

Related U.S. Application Data

(63) Continuation of application No. 16/244,344, filed on Jan. 10, 2019, now Pat. No. 10,902,817.

(30) Foreign Application Priority Data

Jan. 19, 2018 (KR) .......................... 10-2018-0007052

(51) Int. Cl.
  *G09G 3/36* (2006.01)
  *G09G 5/12* (2006.01)
  *G02F 1/133* (2006.01)

(52) U.S. Cl.
  CPC ....... *G09G 3/3696* (2013.01); *G02F 1/13306* (2013.01); *G09G 3/3655* (2013.01);
  (Continued)

(58) Field of Classification Search
  CPC ........ G02F 1/13306; G09G 2320/0247; G09G 2320/0257; G09G 2340/0435; G09G 3/3655; G09G 3/3696; G09G 5/12
  See application file for complete search history.

(56) References Cited

U.S. PATENT DOCUMENTS

| 8,823,780 B2 | 9/2014 | Lee |
| 9,530,384 B2 | 12/2016 | Saitoh et al. |
| 10,127,882 B2 | 11/2018 | Kim et al. |
| 2006/0007094 A1 | 1/2006 | Kang et al. |
| 2006/0125715 A1* | 6/2006 | Choi ................... G09G 3/3655 345/14 |

(Continued)

FOREIGN PATENT DOCUMENTS

| CN | 102163407 | 8/2011 |
| EP | 3193324 | 9/2016 |

(Continued)

OTHER PUBLICATIONS

Office Action dated Apr. 19, 2022 in related Korean Patent Application No. 10-2018-0007052 (7 pages).

(Continued)

*Primary Examiner* — Ram A Mistry
(74) *Attorney, Agent, or Firm* — F. CHAU & ASSOCIATES, LLC

(57) ABSTRACT

A liquid crystal display device includes a source device that outputs image data and a sink device that performs a displaying operation based on the image data. The source device changes a frame rate of an image frame composing the image data while the displaying operation is performed. The sink device changes a frame rate of a panel driving frame for the displaying operation by adjusting a vertical blank period of the panel driving frame as the frame rate of the image frame is changed. Here, the sink device adjusts a common voltage applied to a display panel included in the sink device during a display operation of an individual frame, in accordance with the frame rate of the panel driving frame.

15 Claims, 14 Drawing Sheets

(52) U.S. Cl.
CPC ....... *G09G 5/12* (2013.01); *G09G 2320/0247* (2013.01); *G09G 2320/0257* (2013.01); *G09G 2340/0435* (2013.01)

(56) References Cited

U.S. PATENT DOCUMENTS

| | | | |
|---|---|---|---|
| 2014/0092150 A1* | 4/2014 | Slavenburg | G09G 5/001 345/698 |
| 2014/0198138 A1* | 7/2014 | Nambi | G09G 3/36 345/87 |
| 2017/0084235 A1 | 3/2017 | Yeo et al. | |
| 2019/0088224 A1* | 3/2019 | Fujimoto | G09G 3/3655 |
| 2019/0228733 A1 | 7/2019 | Koo et al. | |

FOREIGN PATENT DOCUMENTS

| | | |
|---|---|---|
| JP | 11-202292 | 7/1999 |
| JP | 2013-213912 | 10/2013 |
| JP | 2016-508239 | 3/2016 |
| KR | 10-2012-0072558 | 7/2012 |
| KR | 10-1550918 | 9/2015 |
| KR | 10-2017-0076478 | 7/2017 |
| KR | 10-2017-0085648 | 7/2017 |
| WO | 2014077194 | 5/2014 |

OTHER PUBLICATIONS

Extended European Search Report dated Feb. 28, 2019 from the European Patent Office for corresponding European Patent Application No. 19152634.2 (11 pages).
Chinese Office Action dated Sep. 17, 2021 in corresponding Chinese Patent Application No. 201910046789.7 (in Chinese), 8 pages.
Office Action dated Oct. 4, 2022 in related Japanese Patent Application No. 2019-002030, in Japanese (4 pages).
Office Action dated May 9, 2023 in related Japanese Patent Application No. 2019-002030, in Japanese (4 pages).

* cited by examiner

SINK DEVICE WITH VARIABLE FRAME RATE AND DISPLAY DEVICE INCLUDING THE SAME

CROSS-REFERENCE TO RELATED APPLICATION(S)

This application is a continuation of U.S. patent application Ser. No. 16/244,344, filed in the U.S. Patent and Trademark Office on Jan. 10, 2019, which claims priority under 35 USC § 119 to Korean Patent Application No. 10-2018-0007052, filed on Jan. 19, 2018 in the Korean Intellectual Property Office (KIPO), the contents of which are incorporated herein by reference in their entireties.

BACKGROUND

1. Technical Field

Exemplary embodiments relate generally to a display device and more particularly, to a liquid crystal display (LCD) device that dynamically changes a frame rate of a panel driving frame.

2. Discussion of the Related Art

Generally, a liquid crystal display device includes a source device and a sink device. The source device (e.g., a graphic processing unit (GPU)) transmits image data to the sink device, and the sink device performs a displaying operation based on the transmitted image data. Recently, a technique by which the liquid crystal display device changes a frame rate (1/frame length) of an image frame composing the image data in real time according to characteristics of images to be displayed has been proposed. For instance, to conserve power, a frame rate may be reduced for displaying relatively slow moving scenes of a video without any perceivable difference in image quality as compared to a higher frame rate. A frame rate may also be dynamically changed depending on an amount of rendering required for a next frame or frames (thus giving the GPU adequate time to render the subsequent frames). Here, if a frame rate of a panel driving frame for the displaying operation is not changed, the frame rate of the image frame (e.g., a GPU rendering speed) may not be consistent with the frame rate of the panel driving frame, so that a phenomenon such as image tearing, image stuttering, etc. may occur in images displayed by the sink device. Thus, a synchronization technology that changes the frame rate of the panel driving frame by increasing or decreasing a vertical blank period of the panel driving frame as the frame rate of the image frame is changed has been suggested. However, a voltage stored in a storage capacitor (i.e., a difference between voltages applied to opposite terminals of a liquid crystal element) included in each pixel circuit may drop over time, and thus average luminance of the panel driving frame may be reduced by the voltage drop. Thus, the average luminance may differ for respective panel driving frames as the frame rate of the panel driving frame is changed. This deviation in average luminance between frames may cause flicker which is perceivable by a viewer.

SUMMARY

Some exemplary embodiments provide a sink device that can prevent flicker from occurring by reducing (or, minimizing) deviation of average luminance of panel driving frames when changing a frame rate of the panel driving frame.

Some exemplary embodiments provide a liquid crystal display device including the sink device.

According to exemplary embodiments, a liquid crystal display device may include a source device configured to output image data of a plurality of frames and a sink device configured to perform a displaying operation based on the image data. Here, the source device may change a frame rate of an image frame composing the image data while the displaying operation is performed. In addition, the sink device may change a frame rate of a panel driving frame for the displaying operation by adjusting a vertical blank period of the panel driving frame as the frame rate of the image frame is changed. Further, the sink device may adjust a common voltage applied to a display panel included in the sink device during a display operation of an individual frame, in accordance with the frame rate of the panel driving frame.

In exemplary embodiments, an active period of the panel driving frame may be kept constant even when the frame rate of the panel driving frame is changed.

In exemplary embodiments, the sink device may change the frame rate of the panel driving frame to have the same value as the frame rate of the image frame.

In exemplary embodiments, the sink device may increase the frame rate of the panel driving frame by reducing the vertical blank period of the panel driving frame when the source device increases the frame rate of the image frame.

In exemplary embodiments, the sink device may decrease the frame rate of the panel driving frame by increasing the vertical blank period of the panel driving frame when the source device decreases the frame rate of the image frame.

In exemplary embodiments, the sink device may linearly adjust the common voltage.

In exemplary embodiments, the sink device may linearly increase or decrease the common voltage when a pixel voltage applied to the display panel has a positive voltage level.

In exemplary embodiments, the sink device may linearly increase or decrease the common voltage when a pixel voltage applied to the display panel has a negative voltage level.

In exemplary embodiments, the sink device may non-linearly adjust the common voltage.

In exemplary embodiments, the sink device may non-linearly increase or decrease the common voltage when a pixel voltage applied to the display panel has a positive voltage level.

In exemplary embodiments, the sink device may non-linearly increase or decrease the common voltage when a pixel voltage applied to the display panel has a negative voltage level.

In exemplary embodiments, the sink device may reset the common voltage to have a reference voltage level at a starting point of the panel driving frame.

In exemplary embodiments, the sink device may start to adjust the common voltage at the starting point of the panel driving frame.

In exemplary embodiments, the sink device may start to adjust the common voltage at a first point where a predetermined time elapses from the starting point of the panel driving frame.

In exemplary embodiments, the sink device may maintain the common voltage to have the reference voltage level from the starting point of the panel driving frame to the first point.

In exemplary embodiments, the first point may be a starting point of the vertical blank period of the panel driving frame.

In exemplary embodiments, the first point may be a point where a minimum allowed time of the panel driving frame elapses from the starting point of the panel driving frame.

In exemplary embodiments, the source device may change the frame rate of the image frame according to characteristics of images that are displayed by the displaying operation.

In exemplary embodiments, the source device may increase the frame rate of the image frame when a change of the images is faster than a predetermined reference speed.

In exemplary embodiments, the source device may decrease the frame rate of the image frame when a change of the images is slower than a predetermined reference speed.

According to exemplary embodiments, a sink device includes a display panel configured to display image frames based on image data in a displaying operation, and a display panel driving circuit. The display panel driving circuit is configured to: receive the image data from a source device and to drive the display panel; change a frame rate of a panel driving frame for the displaying operation by adjusting a vertical blank period of the panel driving frame, and adjust a common voltage applied to the display panel during a display operation of an individual frame.

In exemplary embodiments, the display panel driving circuit may change the frame rate of the panel driving frame to have the same value as the frame rate of the image frame.

In exemplary embodiments, the display panel driving circuit may linearly adjust the common voltage.

In exemplary embodiments, the display panel driving circuit may non-linearly adjust the common voltage.

In exemplary embodiments, the display panel driving circuit may reset the common voltage to have a reference voltage level at a starting point of the panel driving frame.

In exemplary embodiments, the display panel driving circuit may start to adjust the common voltage at the starting point of the panel driving frame.

In exemplary embodiments, the display panel driving circuit may start to adjust the common voltage at a first point where a predetermined time elapses from the starting point of the panel driving frame.

In exemplary embodiments, the display panel driving circuit may maintain the common voltage to have the reference voltage level from the starting point of the panel driving frame to the first point.

In exemplary embodiments, the first point may be a starting point of the vertical blank period of the panel driving frame.

In exemplary embodiments, the first point may be a point where a minimum allowed time of the panel driving frame elapses from the starting point of the panel driving frame.

In exemplary embodiments, a liquid crystal display device includes a source device configured to output image data of a video composed of a plurality of frames, and a sink device comprising a display panel for displaying images based on the image data. The sink device is configured to: change a current frame length of a panel driving frame for displaying an image of the video, relative to a previous frame length, based on a control signal provided from the source device, by adjusting a vertical blank period of the panel driving frame; and gradually adjust a common voltage applied to the display panel during progression of at least a portion of the panel driving frame, in accordance with the changed frame length.

The common voltage may be gradually adjusted by an amount sufficient to reduce a frame to frame average luminance deviation due to the changed frame length.

The control signal may be provided by the source device as part of a frame structure comprising the image data. Alternatively, the control signal may be provided by the source device separately from the image data.

Therefore, a sink device and a liquid crystal display device including the sink device according to exemplary embodiments may change a frame rate of a panel driving frame (or, a time of the panel driving frame) by increasing or decreasing a vertical blank period of the panel driving frame as a frame rate of an image frame (or, a time of the image frame) is changed. Here, when a pixel voltage applied to a terminal of a liquid crystal element included in each pixel circuit is decreased or increased over time, the sink device and the liquid crystal display device may reduce (or, minimize) deviation of average luminance of the panel driving frames to prevent a flicker that a viewer can perceive from occurring by resetting a common voltage applied to another terminal of the liquid crystal element to have a reference voltage level at a starting point of each panel driving frame and by starting to decrease or increase the common voltage at the starting point or at a point where a predetermined time elapses from the starting point.

BRIEF DESCRIPTION OF THE DRAWINGS

Illustrative, non-limiting exemplary embodiments will be more clearly understood from the following detailed description in conjunction with the accompanying drawings in which like reference characters denote like elements, in which.

DETAILED DESCRIPTION OF EMBODIMENTS

Hereinafter, embodiments of the present inventive concept will be explained in detail with reference to the accompanying drawings.

Figure 1:
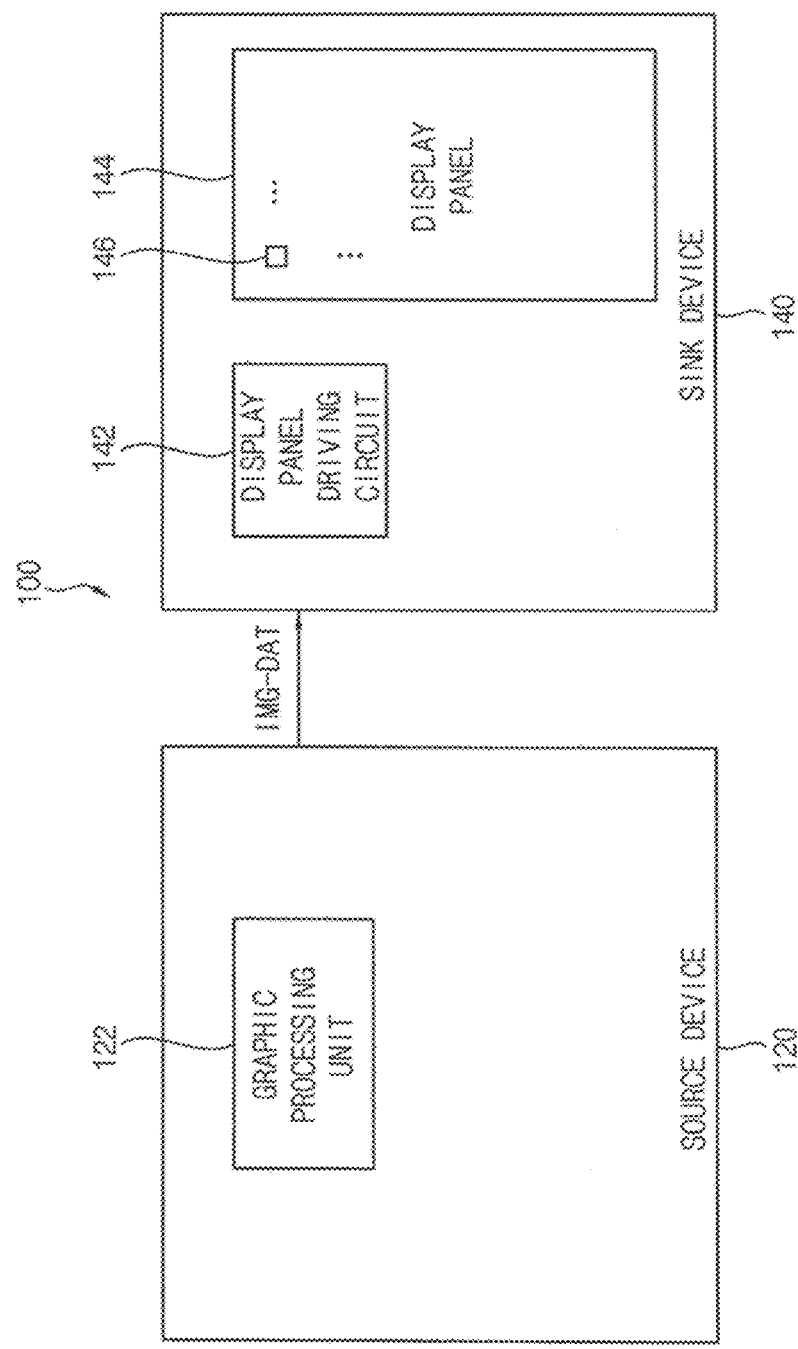
FIG. 1 is a block diagram illustrating a liquid crystal display device according to exemplary embodiments.
Figure 2:
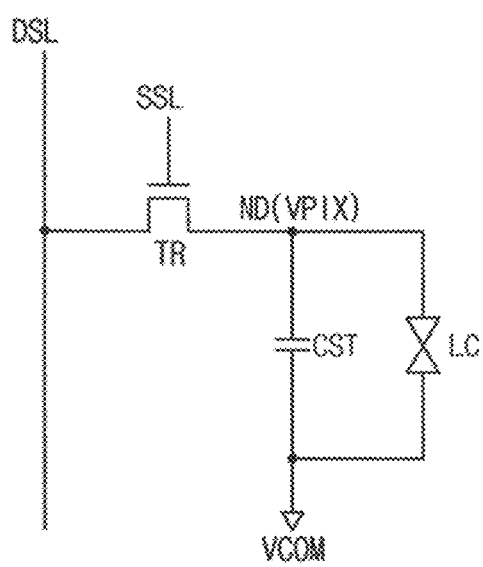
FIG. 2 is a circuit diagram illustrating an example of a pixel circuit included in the liquid crystal display device of FIG. 1.
Figure 3:
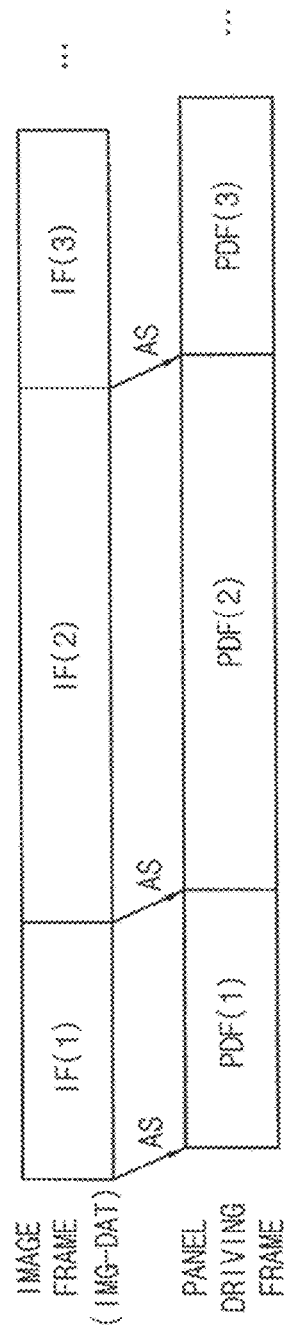
FIG. 3 is a diagram for describing that a frame rate of a panel driving frame is changed as a frame rate of an image frame is changed in the liquid crystal display device of FIG. 1.
Figure 4:
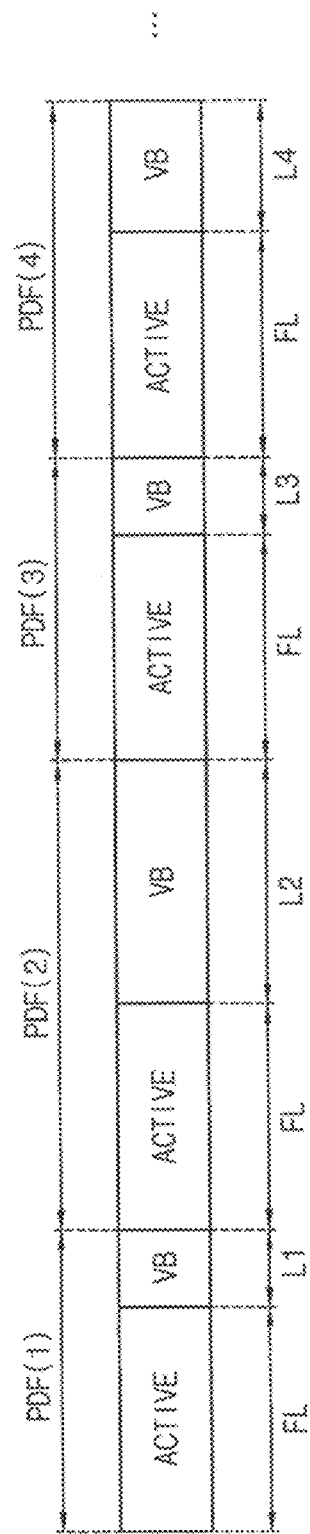
FIG. 4 is a diagram for describing that a sink device changes a frame rate of a panel driving frame by adjusting a vertical blank period of the panel driving frame in the liquid crystal display device of FIG. 1.

FIG. 1 is a block diagram illustrating a liquid crystal display device according to exemplary embodiments. FIG. 2 is a circuit diagram illustrating an example of a pixel circuit included in the liquid crystal display device of FIG. 1. FIG. 3 is a diagram for describing that a frame rate of a panel driving frame is changed as a frame rate of an image frame is changed in the liquid crystal display device of FIG. 1. FIG. 4 is a diagram for describing that a sink device changes a frame rate of a panel driving frame by adjusting a vertical blank period of the panel driving frame in the liquid crystal display device of FIG. 1.

Herein, a "frame rate" of any given frame of video being displayed or to be displayed on a display apparatus is (1/frame length) for that frame. The terms "frame length", "frame duration" and "time of a frame" or the like may be used interchangeably. In the description hereafter, a discussion of a feature involving a frame rate of a frame may be described interchangeably in the context of frame length.

Herein, whenever a result is said to reduce an undesirable outcome or effect, the reduction may be a partial reduction or a minimization of the outcome or effect. For example, when a deviation of an average voltage, average voltage difference, or average luminance between panel driving frames is said to be reduced according to the inventive concept, the deviation may be either partially reduced or minimized. In another example, a reduction in flicker of a displayed image by a display device according to the inventive concept may be a partial reduction in the flicker or a minimization of the flicker.

Referring collectively to FIGS. 1 to 4, the liquid crystal display (LCD) device 100 may include a source device 120 and a sink device 140. Here, the source device 120 and the sink device 140 may perform data communication using a given interface. For example, the source device 120 may transmit image data IMG-DAT to the sink device 140 using an embedded display port (eDP) interface. However, an interface between the source device 120 and the sink device 140 is not limited thereto.

The source device 120 may output the image data IMG-DAT to the sink device 140. For this operation, the source device 120 may include a graphic processing unit 122. The graphic processing unit 122 may perform a given processing on the image data IMG-DAT. During a displaying operation, the source device 120 may dynamically set a frame rate of an image frame IF(i) in a frame sequence (where IF(i) is any one of image frames IF(1), IF(2), IF(3), . . . ) composing the image data IMG-DAT. With such dynamic setting, the frame rate (and frame length) may be changed from frame to frame. For instance, in the case of real time rendering, a rendering speed of the graphic processing unit (GPU) 122 may vary from frame to frame according to characteristics of images to be displayed by the displaying operation. Thus, the GPU 122 may set a frame length in a current frame based on an amount of time it takes to render a next frame or frames (since rendering calculations of a next frame(s) may be performed during the time that already rendered image data of a current frame is output by GPU 122). To this end, the image data IMG-DAT in a data structure sequence of a current frame may be output by GPU 122 in a frame structure that includes fields for luminance/color data for the current frame, and one or more fields for control data. The control data may include codes for setting a frame length for the current frame and/or for one or more succeeding frames. Alternatively, the control data indicating the frame length may be sent by GPU 122 via a separate control signal synchronized with the frame structure of the image data IMG-DAT. It is further noted that the frame length set by GPU 122 need not be dependent upon a rendering time but may be based on other considerations. Moreover, frames of image data IMG-DAT may be output by GPU 122 to sink device 140 synchronously (i.e., in uniform intervals tied to a clock), asynchronously, or in bursts.

For example, the source device 120 may set a relatively high frame rate for a current image frame IF(i) or increase the frame rate of the current image frame relative to that of a prior image frame IF(i−1) when a change of the images displayed by the displaying operation is faster than a predetermined reference speed (e.g., a fast-moving video, etc.). On the other hand, the source device 120 may set a relatively slow frame rate or decrease the frame rate of the image frame IF(i) relative to a previous image frame when a change of the images displayed by the displaying operation is slower than a predetermined reference speed (e.g., a slow-moving video, a still image, etc.). For instance, the source device 120 may "look ahead" a plurality of frames to determine whether the overall video is about to change from a slow moving video to a fast moving video, or vice versa. In the case of a slow moving or nearly static video scene, a viewer may not notice any difference in image quality if the scene is displayed by liquid crystal display device 100 with a low frame rate as opposed to a high frame rate. Since displaying video with a low frame rate may consume less power than that consumed at a high frame rate, GPU 122 may output control data to cause the frame rate of sink device 140 to switch from a high to low frame rate when a transition to a slow moving video scene occurs. In this case, the frame rate may remain constant for several, tens, hundreds or still higher orders of consecutive frames.

If an inconsistency occurs between the frame rate of the image frame IF(i) and the frame rate of a panel driving frame PDF(i) (i.e., any one of panel driving frames PDF(1), PDF(2), PDF(3), . . . ) for the displaying operation a phenomenon such as image tearing, image stuttering, etc. may occur in the displayed images. Thus, the sink device 140 may prevent such a defect by changing the frame rate of the panel driving frame PDF(i) as the frame rate of the image frame IF(i) changes. In other words, as illustrated in FIG. 3, the liquid crystal display device 100 may change the frame rate of the panel driving frame PDF(i) as the frame rate of the image frame IF(i) is changed and may synchronize (or, link) a driving timing of the panel driving frame PDF(i) with a transmitting timing of the image frame IF(i) (i.e., indicated by the synchronization/delay time arrows AS). Because the frame rate (e.g., in hertz (Hz)) of the image frame IF(i) is inversely proportional to a time (i.e., length or duration, e.g., in milliseconds (msec)) of the image frame IF(i), an increase of the frame rate of the image frame IF(i) corresponds to a decrease of the time of the image frame IF(i), and a decrease of the frame rate of the image frame IF(i) corresponds to an increase of the time of the image frame IF(i). Similarly, because the frame rate of the panel driving frame PDF(i) is inversely proportional to a time of the panel driving frame PDF(i), an increase of the frame rate of the panel driving frame PDF(i) corresponds to a decrease of the time of the panel driving frame PDF(i), and a decrease of the frame rate of the panel driving frame PDF(i) corresponds to an increase of the time of the panel driving frame PDF(i).

The sink device 140 may perform the displaying operation based on the image data IMG-DAT output from the source device 120. For this operation, the sink device 140 may include a display panel driving circuit 142 and the display panel 144. The display panel driving circuit 142 may receive the image data IMG-DAT output from the source device 120 and may display an image on the display panel 144 based on the image data IMG-DAT. The display panel driving circuit 142 may include a scan driver that provides a scan signal to the display panel 144, a data driver that provides a data signal to the display panel 144, a timing controller that controls the scan driver and the data driver, etc. The display panel 144 may include a plurality of pixel circuits 146, and each of the pixel circuits 146 may include a liquid crystal element LC. (Hereafter, a pixel circuit 146 may sometimes be referred to as just "pixel" for brevity.) For example, as illustrated in FIG. 2, the pixel circuit 146 included in the display panel 144 of the sink device 140 may include a switching transistor TR, a storage capacitor CST, and the liquid crystal element LC. Other suitable structures of the pixel circuit 146 are also possible. The switching transistor TR may be connected between a data-line DSL and a node ND. A gate terminal of the switching transistor TR may be connected to a scan-line SSL. The storage capacitor CST may be connected between the node ND and a common voltage line supplying a common voltage VCOM. The liquid crystal element LC may be connected between the node ND and the common voltage line. When the switching transistor TR is turned on in response to the scan signal applied via the scan-line SSL, the data signal (i.e., a data voltage corresponding to the image data IMG-DAT) applied via the data-line DSL may be stored in the storage capacitor CST, and thus a pixel voltage VPIX and the common voltage VCOM may be applied to opposite terminals of the storage capacitor CST. The liquid crystal element LC and the storage capacitor CST may be connected in parallel, and thus the pixel voltage VPIX and the common voltage VCOM may be applied to opposite terminals of the liquid crystal element LC. In other words, the liquid crystal element LC may operate based on a voltage stored in the storage capacitor CST (i.e., a difference between the pixel voltage VPIX and the common voltage VCOM applied to opposite terminals of the liquid crystal element LC). Here, the voltage stored in the storage capacitor CST may drop off over time (i.e., an effect in which the pixel voltage VPIX is reduced appears because the common voltage VCOM is continuously applied whereas the pixel voltage VPIX is applied as a pulse), and thus average luminance of the panel driving frame PDF(i) may be reduced by the voltage drop-off.

In exemplary embodiments, the panel driving frame PDF(i) may include an active period ACTIVE and a vertical blank period VB. Each pixel circuit 146 may perform the scan operation in the active period ACTIVE and may perform an emission operation based on light emitted from a backlight unit during both the active period ACTIVE and the vertical blank period VB. As described above, in the liquid crystal display device 100, the frame rate of the panel driving frame PDF(i) may be changed as the frame rate of the image frame IF(i) is changed. Specifically, as illustrated in FIGS. 3 and 4, when the source device 120 changes the frame rate of the image frame IF(i) from one frame to the next, the sink device 140 may change the frame rate of the panel driving frame PDF(i) frame to frame by adjusting the vertical blank period VB of the panel driving frame PDF(i). In an exemplary embodiment, the sink device 140 may change the frame rate of the panel driving frame PDF(i) to have the same value as the frame rate of the image frame IF(i). For example, when the source device 120 increases/decreases the frame rate of the image frame IF(i) (i.e., when the source device 120 decreases/increases the time of the image frame IF(i)), the sink device 140 may respectively increase/decrease the frame rate of the panel driving frame PDF(i) (i.e., the sink device 140 may decrease/increase the time of the panel driving frame PDF(i)) by reducing/lengthening, respectively, the vertical blank period VB of the panel driving frame PDF(i).

As illustrated in FIGS. 3 and 4, the sink device 140 may keep the active period ACTIVE of the panel driving frame PDF(i) constant when changing the frame rate of the panel driving frame PDF(i). In other words, the sink device 140 may change only the vertical blank period VB of the panel driving frame PDF(i) when changing the frame rate of the panel driving frame PDF(i). For example, the first panel driving frame PDF(1) may include the active period ACTIVE having a fixed length FL and the vertical blank period VB having a first length L1; the second panel driving frame PDF(2) may include the active period ACTIVE having the fixed length FL and the vertical blank period VB having a second length L2; the third panel driving frame PDF(3) may include the active period ACTIVE having the fixed length FL and the vertical blank period VB having a third length L3; and the fourth panel driving frame PDF(4) may include the active period ACTIVE having the fixed length FL and the vertical blank period VB having a fourth length L4. As described above, the frame rate of the panel driving frame PDF(i) may be changed as the frame rate of the image frame IF(i) is changed. Here, since the amount of drop-off in the voltage stored in the storage capacitor CST of each pixel circuit 146 (i.e., a change-amount of the pixel voltage VPIX) differs as the frame rate of the panel driving frame PDF(i) is changed, the average luminance of each panel driving frame PDF(i) may differ. Such a deviation in the average luminance that occurs repetitively or intermittently frame to frame may be recognized by a viewer as a flicker. In accordance with the inventive concept, however, the liquid crystal display device 100 may prevent the flicker from occurring by gradually adjusting, during each frame, the common voltage VCOM applied to the display panel 144 (i.e., applied to each pixel circuit 146) when a frame rate change occurs. In particular, as illustrated and described in examples below, the gradual adjustment of the common voltage VCOM may differ from frame to frame, depending on the frame length of the panel driving frame PDF(i).

For instance, in a polarity inversion driving method, liquid crystals are driven with an alternating current to prevent deterioration of image quality resulting from DC stress. Polarity inversion may be implemented with a frame-reversal drive method in which the voltage applied to each pixel varies from frame to frame; an H-line inversion method in which polarity is inverted line to line; and/or a dot inversion method in which polarity is inverted in both column and row directions. Herein, when a pixel is said to be driven at positive polarity, pixel voltage VPIX applied to the pixel (and to one end of the liquid crystal element LC via the switching transistor TR) is higher than a common voltage VCOM applied to the opposite terminal of the liquid crystal element LC. For positive polarity driving, the more positive the pixel voltage VPIX relative to VCOM, the higher the luminance output by the pixel. When a pixel is said to be driven at a negative polarity, pixel voltage VPIX applied to the pixel is lower than the voltage VCOM. In this case, the more negative the pixel voltage VPIX is relative to VCOM, the higher the luminance output by the pixel.

When the pixel voltage VPIX applied to the display panel 144 (and applied to a terminal of the liquid crystal element LC of each pixel circuit 146) has a positive polarity, the sink device 140 may decrease the common voltage VCOM applied to the display panel 144 (specifically, applied to the opposite terminal of the liquid crystal element LC of each pixel circuit 146). In this case, when the pixel voltage VPIX decreases over time within a frame (i.e., an absolute value of the pixel voltage VPIX decreases), the common voltage VCOM may also be controlled to decrease within the frame. Thus, even when the frame rate of the panel driving frame PDF(i) is changed, the frame to frame deviation of an average voltage across opposite terminals of the liquid crystal element LC of each pixel circuit 146 during each panel driving frame PDF(i) may be reduced (or, minimized). Here, because the average voltage across opposite terminals of the liquid crystal element LC of each pixel circuit 146 during each panel driving frame PDF(i) determines the average luminance of each panel driving frame PDF(i), the deviation of the average luminance between the panel driving frames PDF(i) may be reduced when the deviation of the average voltage between the panel driving frames PDF(i) is reduced. Thus, the flicker due to the deviation of the average luminance of the panel driving frames PDF(i) may be prevented. In an exemplary embodiment, the sink device 140 may linearly decrease the common voltage VCOM within a panel driving frame PDF(i). In another exemplary embodiment, the sink device 140 may non-linearly decrease the common voltage VCOM within a panel driving frame PDF(i). In exemplary embodiments, the sink device 140 may reset the common voltage VCOM to have a reference voltage level at a starting point of each panel driving frame PDF(i). According to some exemplary embodiments, the sink device 140 may start to decrease the common voltage VCOM at the starting point of each panel driving frame PDF(i) or may start to decrease at a first point at a predetermined time after the starting point of each panel driving frame PDF(i). For example, the first point may be a starting point of the vertical blank period VB of the panel driving frame PDF(i) or a point where a minimum allowed time of the panel driving frame PDF(i) elapses from the starting point of the panel driving frame PDF(i). These operations will be described in detail with reference to figures below.

For pixels driven at negative polarity, the pixel voltage VPIX applied to the display panel 144 (and applied to a terminal of the liquid crystal element LC of each pixel circuit 146) has a negative voltage level relative to the common voltage VCOM applied to the display panel (and to the opposite terminal of the liquid crystal element LC of each pixel circuit 146). Here, the sink device 140 may increase the common voltage VCOM applied to the display panel 144. That is, when the pixel voltage VPIX increases (i.e., an absolute value of the pixel voltage VPIX decreases) over time, the common voltage VCOM may also be controllably increased. Thus, even when the frame rate of the panel driving frame PDF(i) is changed, the deviation of the average voltage difference formed across opposite terminals of the liquid crystal element LC of each pixel circuit 146 during each panel driving frame PDF(i) may be reduced. Here, because the average voltage formed across opposite terminals of the liquid crystal element LC of each pixel circuit 146 during each panel driving frame PDF(i) determines the average luminance of each panel driving frame PDF(i), the frame to frame deviation of the average luminance of the panel driving frames PDF(i) may be reduced when the deviation of the average voltage difference between the panel driving frames PDF(i), PDF(i+1), . . . is reduced. Thus, the flicker due to the deviation between the average luminance of the panel driving frames PDF(i), PDF(i+1), . . . may be prevented. In an exemplary embodiment, the sink device 140 may linearly increase the common voltage VCOM. In another exemplary embodiment, the sink device 140 may non-linearly increase the common voltage VCOM. In exemplary embodiments, the sink device 140 may reset the common voltage VCOM to have the reference voltage level at the starting point of each panel driving frame PDF(i). According to some exemplary embodiments, the sink device 140 may start to increase the common voltage VCOM at the starting point of each panel driving frame PDF(i) or may start to increase the common voltage VCOM at a first point at a predetermined time following the starting point of each panel driving frame PDF(i). For example, the first point may be the starting point of the vertical blank period VB of the panel driving frame PDF(i) or the point where the minimum allowed time of the panel driving frame PDF(i) elapses from the starting point of the panel driving frame PDF(i). These operations will be described in detail with reference to figures below.

In brief, the liquid crystal display device 100 may change the frame rate of the panel driving frame PDF(i) by increasing or decreasing the vertical blank period VB of the panel driving frame PDF(i) as the frame rate of the image frame IF(i) is changed. Here, when the pixel voltage applied to a terminal of the liquid crystal element LC included in each pixel circuit 146 is decreased or increased over time, the liquid crystal display device 100 may reduce the deviation of the average luminance of the panel driving frames PDF(i) to prevent the flicker that the viewer can perceive from occurring by resetting the common voltage VCOM to have the reference voltage level at the starting point of each panel driving frame PDF(i) and by starting to decrease or increase the common voltage VCOM at the starting point of each panel driving frame PDF(i) or at the point where the predetermined time elapses from the starting point of each panel driving frame PDF(i). As a result, the liquid crystal display device 100 may provide a high-quality image to the viewer. For convenience of description, although it is illustrated in FIG. 1 that the source device 120 includes the graphic processing unit 122 and the sink device 140 includes the display panel driving circuit 142 and the display panel 144, it should be understood that the source device 120 may further include other components (e.g., a processor, a frame buffer memory, a transmitting circuit, etc.) and the sink device 140 may further include other components (e.g., a processor, a frame buffer memory, a receiving circuit, etc.).

Figure 5A:
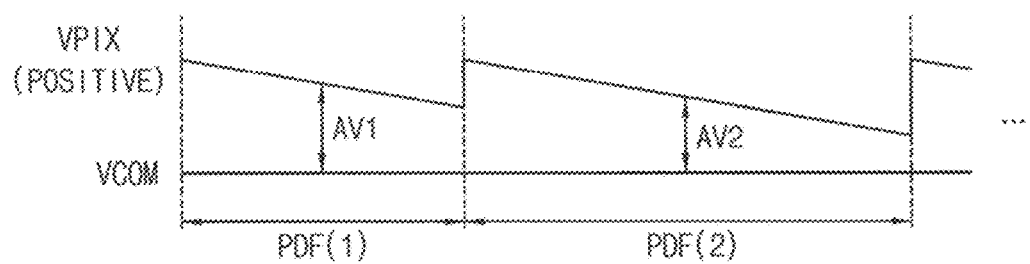
FIG. 5A is a diagram illustrating a drop-off of a pixel voltage that occurs over time when the pixel voltage has a positive polarity in a conventional liquid crystal display device.
Figure 5B:
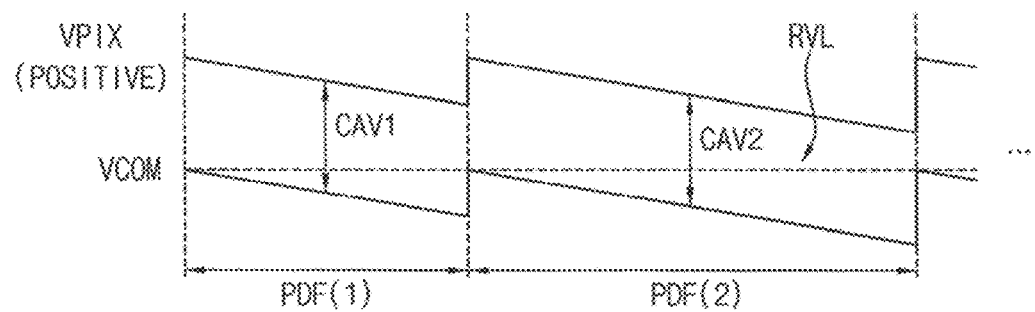
FIG. 5B is a diagram illustrating an example in which a sink device adjusts a common voltage when a pixel voltage has a positive polarity in the liquid crystal display device of FIG. 1.

FIG. 5A is a diagram illustrating drop-off of a pixel voltage that occurs over time when the pixel voltage has a positive polarity in a conventional liquid crystal display device (i.e., the pixel is driven with a voltage higher than the common voltage). FIG. 5B is a diagram illustrating an example in which a sink device adjusts a common voltage when a pixel voltage has a positive polarity level in the liquid crystal display device of FIG. 1.

Referring to FIGS. 5A and 5B, when the pixel voltage VPIX applied to the display panel 144 (for example, applied to a terminal of the liquid crystal element LC of each pixel circuit 146) has a positive polarity, the pixel voltage VPIX may drop off over time during a panel driving frame PDF(j) (e.g., any of PDF(1) or PDF(2) in FIGS. 5A, 5B, 6A, 6B). In other words, the absolute value of the pixel voltage VPIX may decrease over time. Here, as illustrated in FIG. 5A, in a conventional liquid crystal display device, when the pixel voltage VPIX having a positive polarity drops off over time during a panel driving frame PDF(j), an "average voltage difference" AVj may be defined as an average voltage of pixel voltage VPIX relative to the common voltage VCOM, which is the average voltage across opposite terminals of the liquid crystal element LC over the duration of the frame. In the conventional display apparatus, as illustrated in FIG. 5A, this average voltage difference AVj differs according to the frame rate of the panel driving frame PDF(j) because the common voltage VCOM applied to the opposite terminal of the liquid crystal element LC of the pixel is fixed. For example, in FIG. 5A, the drop-off of the pixel voltage VPIX of the first panel driving frame PDF(1) may be smaller than that of the second panel driving frame PDF(2) because the frame rate of the first panel driving frame PDF(1) is higher than that of the second panel driving frame PDF(2). Thus, the average voltage difference AV1 of the first panel driving frame PDF(1) may be greater than the average voltage difference AV2 of the second panel driving frame PDF(2). The average voltage difference AV1 of the first panel driving frame PDF(1) and the average voltage difference AV2 of the second panel driving frame PDF(2) determine the average luminance of the first panel driving frame PDF(1) and the average luminance of the second panel driving frame PDF(2), respectively. Hence, the deviation between the average voltage difference AV1 of the first panel driving frame PDF(1) and the average voltage difference AV2 of the second panel driving frame PDF(2) may result in a deviation between the average luminance of the first panel driving frame PDF(1) and the average luminance of the second panel driving frame PDF(2). This deviation in average luminance that occurs periodically or intermittently between panel driving frames PDF(1), PDF(2), . . . may result in a flicker recognizable by a viewer as a display defect. In other words, the conventional liquid crystal display device may not prevent the flicker due to the deviation of the average luminance of the panel driving frames PDF(j), which occurs when the frame rate of the panel driving frame PDF(j) changes.

On the other hand, as illustrated in FIG. 5B, in the liquid crystal display device 100 of FIG. 1, when the pixel voltage VPIX having a positive polarity voltage is decreased (i.e., the absolute value of the pixel voltage VPIX is decreased) over time, the sink device 140 may decrease the common voltage VCOM applied to the display panel 144 (specifically, applied to another terminal of the liquid crystal element LC of each pixel circuit 146). Thus, the deviation of the average voltage difference (e.g., the deviation between CAV1 and CAV2) formed across opposite terminals of the liquid crystal element LC of each pixel circuit 146 during each panel driving frame PDF(j) may be reduced when the frame rate of the panel driving frame PDF(j) is changed. For example, the reduction the pixel voltage VPIX of the second panel driving frame PDF(2) may be greater than that of the first panel driving frame PDF(1) because the frame rate of the second panel driving frame PDF(2) is lower than that of the first panel driving frame PDF(1). However, because the sink device 140 decreases the common voltage VCOM during the frame as the pixel voltage VPIX is decreased, the deviation between the average voltage difference CAV1 of the first panel driving frame PDF(1) and the average voltage difference CAV2 of the second panel driving frame PDF(2) may be reduced. Here, since the average voltage difference CAV1 of the first panel driving frame PDF(1) and the average voltage difference CAV2 of the second panel driving frame PDF(2) determine the average luminance of the first panel driving frame PDF(1) and the average luminance of the second panel driving frame PDF(2), respectively, the deviation between the average luminance of the first panel driving frame PDF(1) and the average luminance of the second panel driving frame PDF(2) may be reduced. Thus, the flicker generated when the conventional display apparatus is used (as in the case of FIG. 5A) is reduced or eliminated with liquid crystal display device 100 utilizing the driving scheme of FIG. 5B, whereby a viewer may not recognize any flicker. In other words, the liquid crystal display device 100 of FIG. 1 may prevent the flicker due to the deviation of the average luminance between the panel driving frames PDF(j), PDF(j+1), . . . when the frame rate of the panel driving frame PDF(j), PDF(j+1), . . . periodically/intermittently changes.

In an exemplary embodiment, as illustrated in FIG. 5B, the sink device 140 may linearly decrease the common voltage VCOM applied to the display panel 144. In another exemplary embodiment, the sink device 140 may non-linearly decrease the common voltage VCOM applied to the display panel 144. In exemplary embodiments, the sink device 140 may reset the common voltage VCOM to have the same reference voltage level RVL at the starting point of each panel driving frame PDF(j). In an exemplary embodiment, as illustrated in FIG. 5B, the sink device 140 may start to decrease the common voltage VCOM at the starting point of each panel driving frame PDF(j). In another exemplary embodiment, the sink device 140 may start to decrease the common voltage VCOM a predetermined time after the starting point of each panel driving frame PDF(j). For example, the predetermined time may coincide with the starting point of the vertical blank period VB of the panel driving frame PDF(j) or a point where a minimum allowed time of the panel driving frame PDF(j) elapses from the starting point of the panel driving frame PDF(j). As described above, when the pixel voltage VPIX having a positive polarity, which is applied to a terminal of the liquid crystal element LC of each pixel circuit 146, decreases during the course a frame, the liquid crystal display device 100 may cause the sink device 140 to decrease the common voltage VCOM, which is applied to the opposite terminal of the liquid crystal element LC of each pixel circuit 146, after resetting the common voltage VCOM to have the same reference voltage level RVL at the starting point of each panel driving frame PDF(j). That is, the liquid crystal display device 100 may prevent the flicker that the viewer can recognize from occurring by reducing the deviation of the average luminance of the panel driving frames PDF(j). As a result, the liquid crystal display device 100 may provide a high-quality image to the viewer.

Figure 6A:
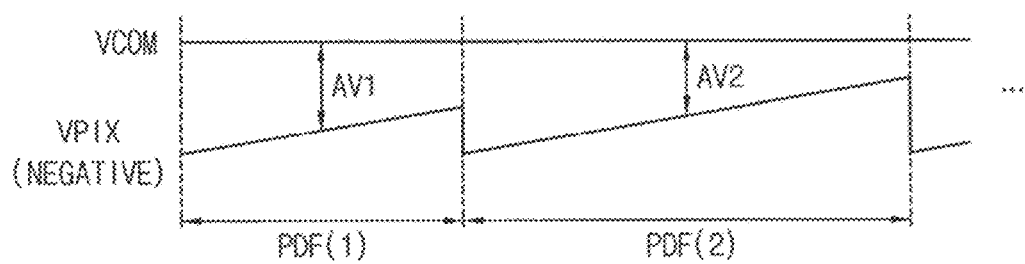
FIG. 6A is a diagram illustrating a drop-off of a pixel voltage that occurs over time when the pixel voltage has a negative polarity in a conventional liquid crystal display device.
Figure 6B:
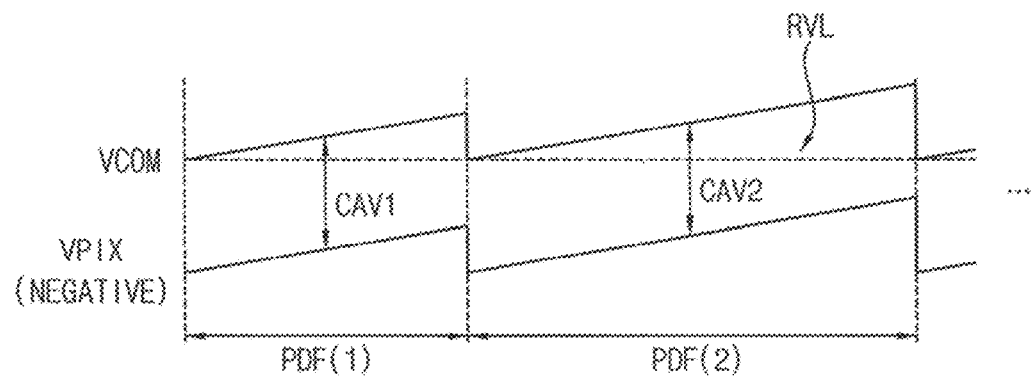
FIG. 6B is a diagram illustrating an example in which a sink device adjusts a common voltage when a pixel voltage has a negative polarity in the liquid crystal display device of FIG. 1.

FIG. 6A is a diagram illustrating a reduction of a pixel voltage difference relative to a common voltage, that occurs over time when the pixel voltage has a negative polarity in a conventional liquid crystal display device. FIG. 6B is a diagram illustrating an example in which a sink device adjusts a common voltage when a pixel voltage has a negative polarity in the liquid crystal display device of FIG. 1.

Referring to FIGS. 6A and 6B, when the pixel voltage VPIX applied to the display panel 144 (specifically, applied to a terminal of the liquid crystal element LC of each pixel circuit 146) has a negative polarity, the pixel voltage VPIX may increase over time (i.e., the absolute value difference of the pixel voltage VPIX relative to the common voltage VCOM may decrease over time). Here, as illustrated in FIG. 6A, in a conventional liquid crystal display device, when the pixel voltage VPIX having a negative polarity increases over time (i.e., the absolute value of the pixel voltage VPIX relative to the common voltage VCOM decreases over time), a deviation of the average voltage difference (e.g., a deviation between AV1 and AV2) across opposite terminals of the liquid crystal element LC of each pixel circuit 146 may result, due to a change in the frame rate between panel driving frames PDF(1) and PDF(2), because the common voltage VCOM applied to the display panel 144 is fixed. For example, the reduction of the pixel voltage VPIX difference relative to VCOM of the first panel driving frame PDF(1) may be smaller than that of the second panel driving frame PDF(2) because the frame rate of the first panel driving frame PDF(1) is higher than that of the second panel driving frame PDF(2). Thus, the average voltage difference AV1 of the first panel driving frame PDF(1) may be greater than the average voltage difference AV2 of the second panel driving frame PDF(2). The average voltage difference AV1 of the first panel driving frame PDF(1) and the average voltage difference AV2 of the second panel driving frame PDF(2) determine the average luminance of the first panel driving frame PDF(1) and the average luminance of the second panel driving frame PDF(2), respectively. Hence, the deviation between the average voltage difference AV1 of the first panel driving frame PDF(1) and the average voltage difference AV2 of the second panel driving frame PDF(2) may result in a deviation between the average luminance of the first panel driving frame PDF(1) and the average luminance of the second panel driving frame PDF(2). As in the case of FIG. 5A discussed for the positive polarity condition, this deviation in average luminance between frames that occurs periodically or intermittently may result in flicker recognizable by a viewer. In other words, the conventional liquid crystal display device may not prevent the flicker due to the deviation of the average luminance of the panel driving frames PDF(j), which occurs when the frame rate of the panel driving frame PDF(j) is changed.

On the other hand, as illustrated in FIG. 6B, in the liquid crystal display device 100 of FIG. 1, when the pixel voltage VPIX having a negative polarity increases over time, the sink device 140 may correspondingly increase the common voltage VCOM applied to the display panel 144. Thus, the deviation of the average voltage difference (e.g., the deviation between voltages CAV1 and CAV2) across opposite terminals of the liquid crystal element LC of each pixel circuit 146 during each panel driving frame PDF(j) may be reduced when the frame rate of the panel driving frame PDF(j) is changed. For example, the reduction of the pixel voltage VPIX difference relative to VCOM of the second panel driving frame PDF(2) may be greater than that of the first panel driving frame PDF(1) because the frame rate of the second panel driving frame PDF(2) is lower than that of the first panel driving frame PDF(1). However, because the sink device 140 increases the common voltage VCOM as the pixel voltage VPIX is increased, the deviation between the average voltage difference CAV1 of the first panel driving frame PDF(1) and the average voltage difference CAV2 of the second panel driving frame PDF(2) may be reduced. Here, the average voltage difference CAV1 of the first panel driving frame PDF(1) and the average voltage difference CAV2 of the second panel driving frame PDF(2) determine the average luminance of the first panel driving frame PDF(1) and the average luminance of the second panel driving frame PDF(2), respectively. As such, the deviation between the average luminance of the first panel driving frame PDF(1) and the average luminance of the second panel driving frame PDF(2) may be reduced. Thus, the flicker generated when the conventional display apparatus is used (as in the case of FIG. 6A) is reduced or eliminated with LCD 100 utilizing the driving scheme of FIG. 6B, whereby a viewer may not recognize any flicker. In other words, the liquid crystal display device 100 of FIG. 1 may prevent the flicker due to the deviation of the average luminance between the panel driving frames PDF(j), PDF (j+1), . . . when the frame rate of the panel driving frame PDF(j), PDF(j+1), . . . periodically/intermittently changes.

In an exemplary embodiment, as illustrated in FIG. 6B, the sink device 140 may linearly increase the common voltage VCOM applied to the display panel 144 over the course of a panel driving frame PDF(j). In another exemplary embodiment, the sink device 140 may non-linearly increase the common voltage VCOM. In exemplary embodiments, the sink device 140 may reset the common voltage VCOM to have the same reference voltage level RVL at the starting point of each panel driving frame PDF(j). In an exemplary embodiment, as illustrated in FIG. 6B, the sink device 140 may start to increase the common voltage VCOM at the starting point of each panel driving frame PDF(j). In another exemplary embodiment, the sink device 140 may start to increase the common voltage VCOM at a first point at which a predetermined time elapses from the starting point of each panel driving frame PDF(j). For example, the first point may be the starting point of the vertical blank period VB of the panel driving frame PDF(j) or the point where a minimum allowed time of the panel driving frame PDF(j) elapses from the starting point of the panel driving frame PDF(j). As described above, when the pixel voltage VPIX having a negative polarity, which is applied to a terminal of the liquid crystal element LC of each pixel circuit 146, increases over time, the liquid crystal display device 100 may cause the sink device 140 to increase the common voltage VCOM, which is applied to the opposite terminal of the liquid crystal element LC of each pixel circuit 146, after resetting the common voltage VCOM to have the reference voltage level RVL at the starting point of each panel driving frame PDF(j). That is, the liquid crystal display device 100 may reduce or prevent the flicker that a viewer may otherwise recognize by reducing (or, minimizing) the deviation of the average luminance between the panel driving frames PDF(j). As a result, the liquid crystal display device 100 may provide a high-quality image to the viewer.

It is noted that in FIGS. 5B and 6B, the pixel voltage VPIX is illustrated as linearly ramping down and up, respectively, during a panel driving frame PDF(j) from a starting point to an end point of the frame, and the common voltage VCOM may be controlled during the frame to linearly ramp with substantially the same slope as that of the pixel voltage VPIX. In other examples, the pixel voltage VPIX may change nonlinearly during the panel driving frame PDF(i). Here, the common voltage VCOM may be controlled to ramp linearly or nonlinearly to improve image quality by reducing deviation of average luminance between panel driving frames.

Figure 7A:
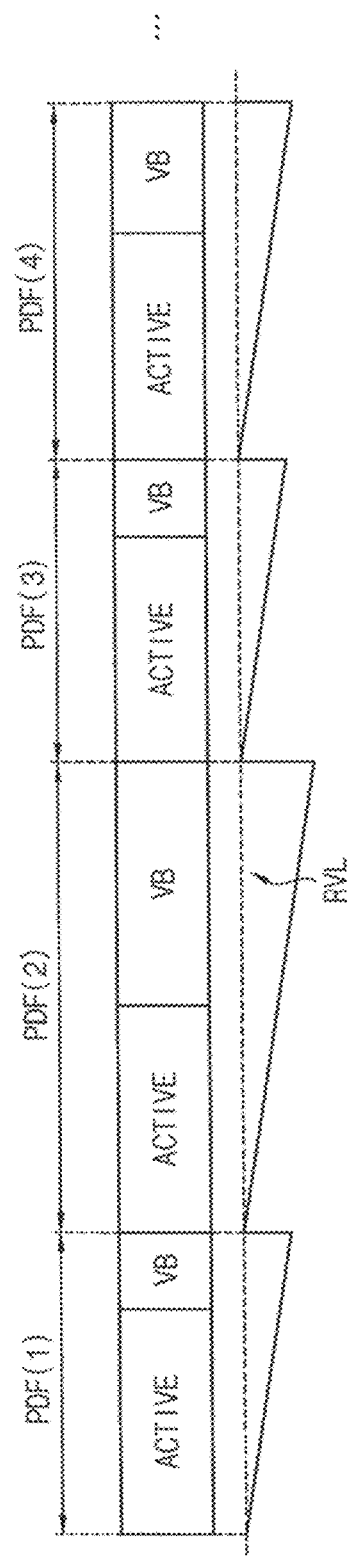
FIGS. 7A and 7B are diagrams illustrating respective examples in which a sink device starts to adjust a common voltage at a starting point of a panel driving frame in the liquid crystal display device of FIG. 1.
Figure 7B:
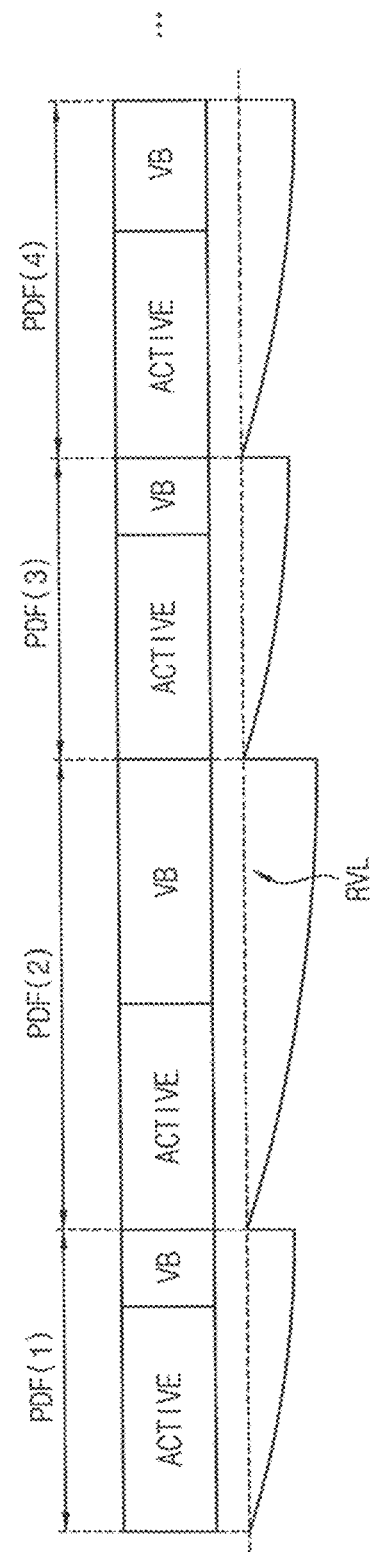

FIGS. 7A and 7B are diagrams illustrating examples in which a sink device starts to adjust a common voltage at a starting point of a panel driving frame in the liquid crystal display device of FIG. 1.

Referring to FIGS. 7A and 7B, the sink device 140 may start to adjust the common voltage VCOM at the starting point of the panel driving frame PDF(i). For convenience of description, it is illustrated in FIGS. 7A and 7B that the pixel voltage VPIX has a positive polarity and the sink device 140 decreases the common voltage VCOM during the frame. As illustrated in FIGS. 7A and 7B, the sink device 140 may reset the common voltage VCOM to have the reference voltage level RVL at the starting point of the panel driving frame PDF(i). Thus, the sink device 140 may decrease the common voltage VCOM having the reference voltage level RVL over time from the starting point of the panel driving frame PDF(i). (For pixels being driven by negative polarity voltages, the sink device 140 may linearly or non-linearly increase the common voltage VCOM from the same starting level RVL in each frame (where the linear case was illustrated in FIG. 6B)). In an exemplary embodiment, as illustrated in FIG. 7A, the sink device 140 may linearly decrease the common voltage VCOM having the reference voltage level RVL over time from the starting point of the panel driving frame PDF(i). In another exemplary embodiment, as illustrated in FIG. 7B, the sink device 140 may non-linearly decrease the common voltage VCOM having the reference voltage level RVL over time from the starting point of the panel driving frame PDF(i). Thus, the deviation of the average voltage difference between the panel driving frames PDF(i) may be reduced, so that the deviation of the average luminance between the panel driving frames PDF(i) may also be reduced. As a result, flicker otherwise generated due to the deviation of the average luminance between the panel driving frames PDF(i) is prevented or reduced. Thus, the liquid crystal display device 100 may provide a high-quality image to the viewer.

Figure 8A:
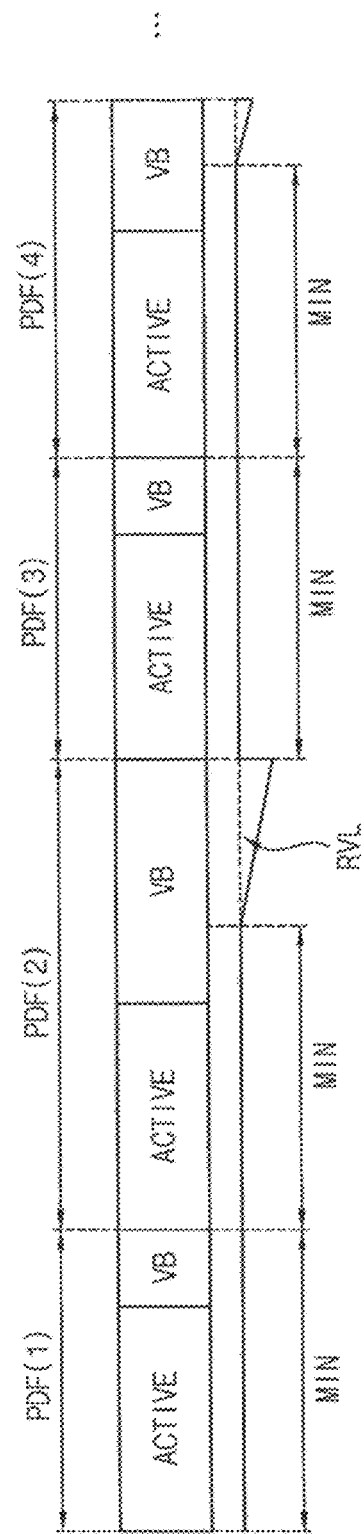
FIGS. 8A and 8B are diagrams illustrating respective examples in which a sink device starts to adjust a common voltage at a point where a minimum allowed time of a panel driving frame elapses from a starting point of the panel driving frame in the liquid crystal display device of FIG. 1.
Figure 8B:
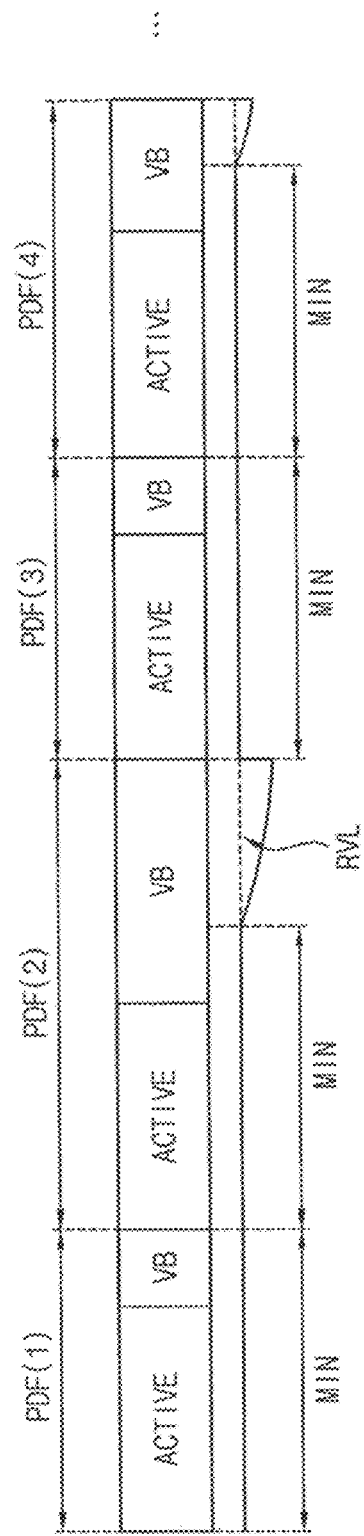

FIGS. 8A and 8B are diagrams illustrating examples in which a sink device starts to adjust a common voltage at a point where a minimum allowed time of a panel driving frame elapses from a starting point of the panel driving frame in the liquid crystal display device of FIG. 1.

Referring to FIGS. 8A and 8B, the sink device 140 may start to adjust the common voltage VCOM at the point where the minimum allowed time MIN of the panel driving frame PDF(i) elapses from the starting point of the panel driving frame PDF(i). Here, the minimum allowed time MIN of the panel driving frame PDF(i) may correspond to a maximum driving frequency of the panel driving frame PDF(i). For convenience of description, it is illustrated in FIGS. 8A and 8B that the pixel voltage VPIX has a positive polarity voltage and the sink device 140 decreases the common voltage VCOM. For a pixel driven with a negative polarity voltage VPIX, the sink device 140 may increase the common voltage VCOM from the point of the minimum allowed time MIN. As illustrated in FIGS. 8A and 8B, the sink device 140 may reset the common voltage VCOM to have the reference voltage level RVL at the starting point of the panel driving frame PDF(i). Subsequently, the sink device 140 may maintain the common voltage VCOM at the reference voltage level RVL from the starting point of the panel driving frame PDF(i) to the point where the minimum allowed time MIN of the panel driving frame PDF(i) elapses from the starting point of the panel driving frame PDF(i). Next, the sink device 140 may decrease the common voltage VCOM having the reference voltage level RVL over time from the point where the minimum allowed time MIN of the panel driving frame PDF(i) elapses from the starting point of the panel driving frame PDF(i). In an exemplary embodiment, as illustrated in FIG. 8A, the sink device 140 may linearly decrease the common voltage VCOM having the reference voltage level RVL over time from the point where the minimum allowed time MIN of the panel driving frame PDF(i) elapses from the starting point of the panel driving frame PDF(i). In another exemplary embodiment, as illustrated in FIG. 8B, the sink device 140 may non-linearly decrease the common voltage VCOM having the reference voltage level RVL over time from the point where the minimum allowed time MIN of the panel driving frame PDF(i) elapses from the starting point of the panel driving frame PDF(i). Thus, the deviation of the average voltage difference of the panel driving frames PDF(i) may be reduced, so that the deviation of the average luminance of the panel driving frames PDF(i) may also be reduced. As a result, flicker otherwise generated due to the deviation of the average luminance of the panel driving frames PDF(i) is prevented or reduced. Thus, the liquid crystal display device 100 may provide a high-quality image to the viewer.

Figure 9A:
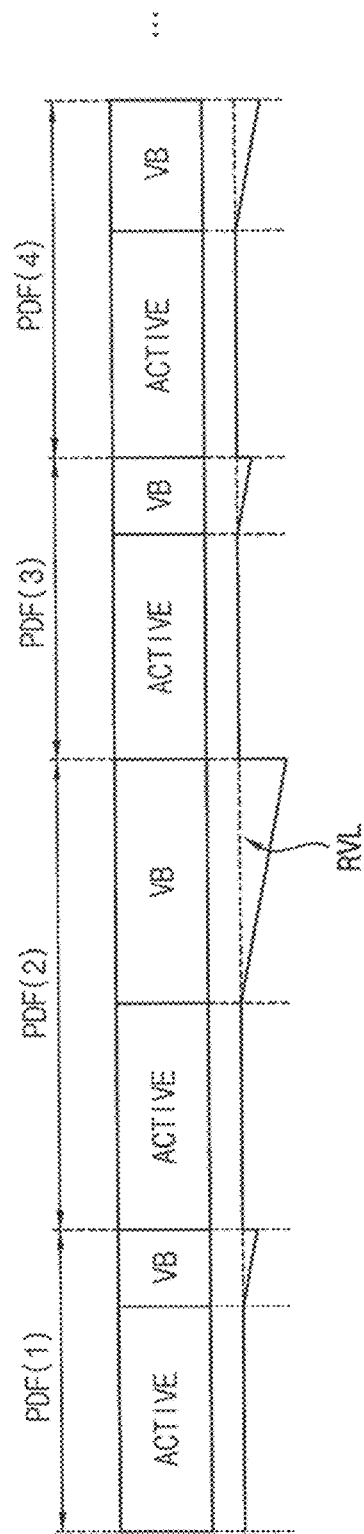
FIGS. 9A and 9B are diagrams illustrating respective examples in which a sink device starts to adjust a common voltage at a starting point of a vertical blank period of a panel driving frame in the liquid crystal display device of FIG. 1.
Figure 9B:
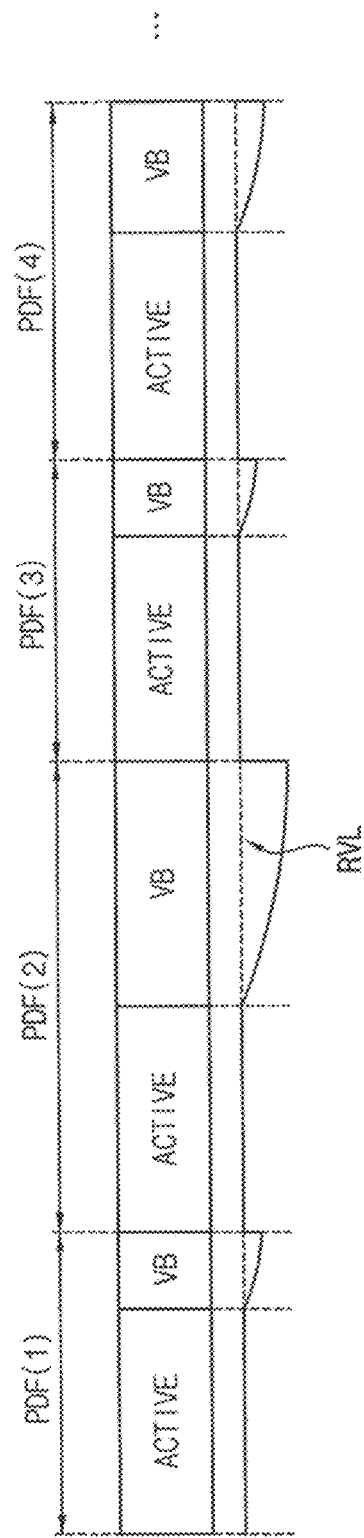

FIGS. 9A and 9B are diagrams illustrating examples in which a sink device starts to adjust a common voltage at a starting point of a vertical blank period of a panel driving frame in the liquid crystal display device of FIG. 1.

Referring to FIGS. 9A and 9B, the sink device 140 may start to adjust the common voltage VCOM at the starting point of the vertical blank period VB of the panel driving frame PDF(i). For convenience of description, it is illustrated in FIGS. 9A and 9B that the pixel voltage VPIX has a positive voltage level and the sink device 140 decreases the common voltage VCOM. For a pixel driven with a negative polarity voltage VPIX, the sink device 140 may increase the common voltage VCOM from the starting point of the vertical blank period VB. As illustrated in FIGS. 9A and 9B, the sink device 140 may reset the common voltage VCOM to have the reference voltage level RVL at the starting point of the panel driving frame PDF(i). Subsequently, the sink device 140 may maintain the common voltage VCOM to have the reference voltage level RVL from the starting point of the panel driving frame PDF(i) to the starting point of the vertical blank period VB of the panel driving frame PDF(i). Next, the sink device 140 may decrease the common voltage VCOM having the reference voltage level RVL over time from the starting point of the vertical blank period VB of the panel driving frame PDF(i). In an exemplary embodiment, as illustrated in FIG. 9A, the sink device 140 may linearly decrease the common voltage VCOM having the reference voltage level RVL over time from the starting point of the vertical blank period VB of the panel driving frame PDF(i). In another exemplary embodiment, as illustrated in FIG. 9B, the sink device 140 may non-linearly decrease the common voltage VCOM having the reference voltage level RVL over time from the starting point of the vertical blank period VB of the panel driving frame PDF(i). Thus, the deviation of the average voltage difference of the panel driving frames PDF(i) may be reduced, so that the deviation of the average luminance of the panel driving frames PDF(i) may also be reduced. As a result, flicker otherwise generated due to the deviation of the average luminance of the panel driving frames PDF(i) is prevented or reduced. Thus, the liquid crystal display device 100 may provide a high-quality image to the viewer.

Figure 10:
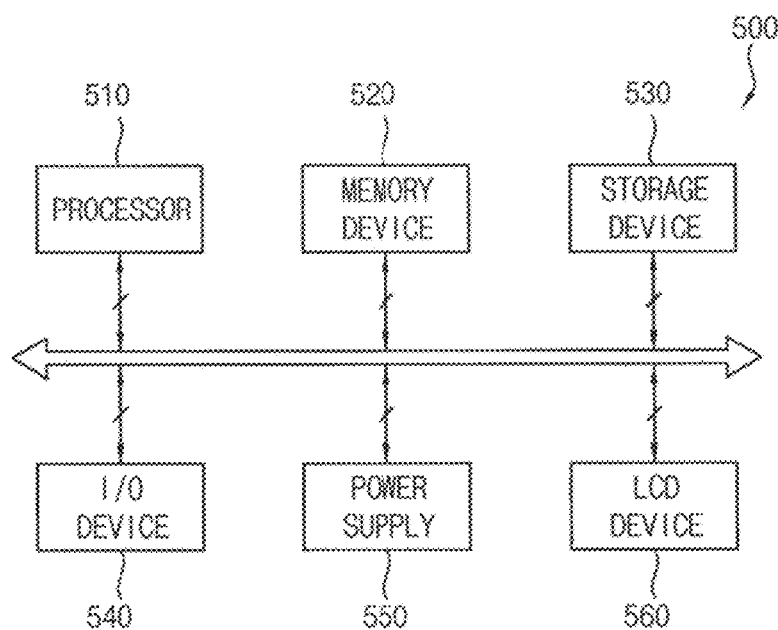
FIG. 10 is a block diagram illustrating an electronic device according to exemplary embodiments.
Figure 11:
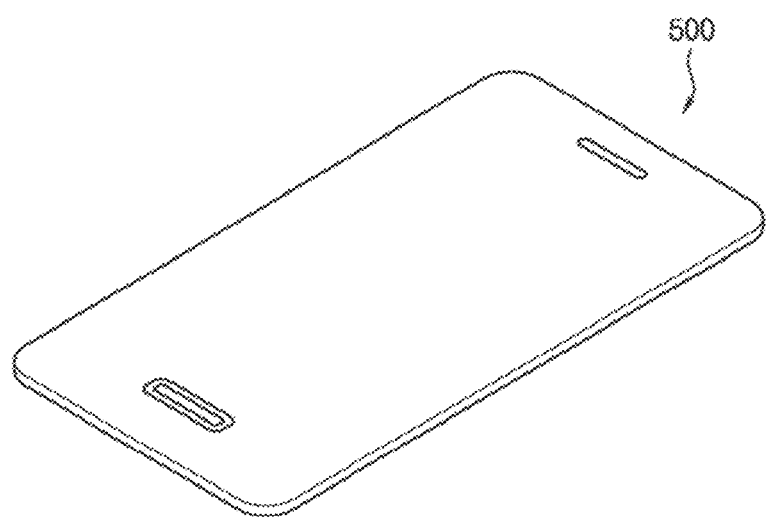
FIG. 11 is a diagram illustrating an example in which the electronic device of FIG. 10 is implemented as a smart phone.
Figure 12:
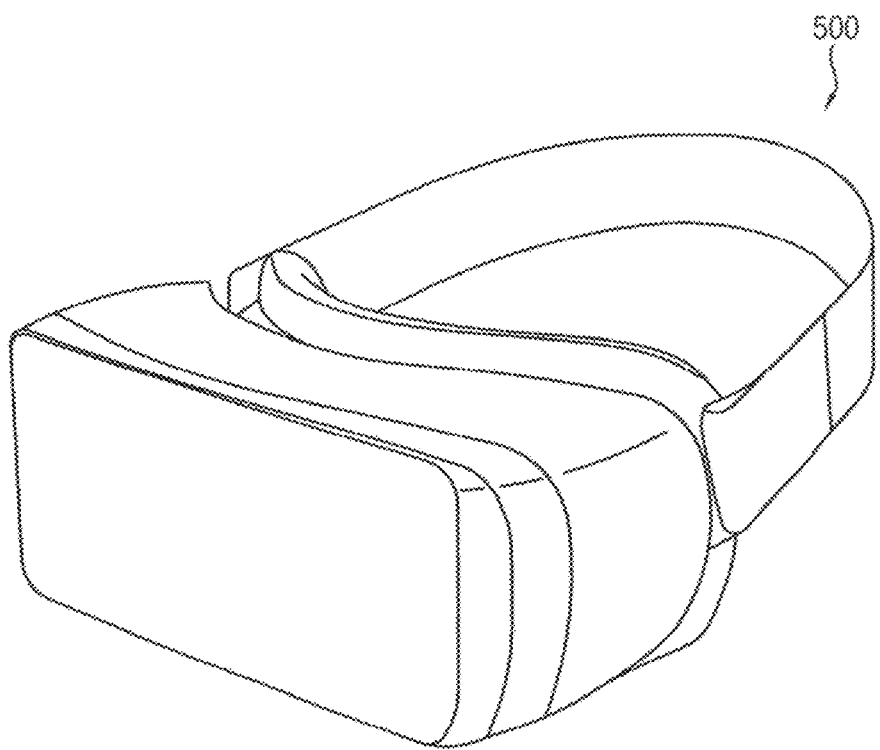
FIG. 12 is a diagram illustrating an example in which the electronic device of FIG. 10 is implemented as a head mounted display (HMD) device.

FIG. 10 is a block diagram illustrating an electronic device according to exemplary embodiments. FIG. 11 is a diagram illustrating an example in which the electronic device of FIG. 10 is implemented as a smart phone. FIG. 12 is a diagram illustrating an example in which the electronic device of FIG. 10 is implemented as a head mounted display (HMD) device.

Referring to FIGS. 10 to 12, the electronic device 500 may include a processor 510, a memory device 520, a storage device 530, an input/output (I/O) device 540, a power supply 550, and a liquid crystal display device 560. Here, the liquid crystal display device 560 may be the liquid crystal display device 100 of FIG. 1. In addition, the electronic device 500 may further include a plurality of ports for communicating with a video card, a sound card, a memory card, a universal serial bus (USB) device, other electronic devices, etc. In an exemplary embodiment, as illustrated in FIG. 11, the electronic device 500 may be implemented as the smart phone. In another exemplary embodiment, as illustrated in FIG. 12, the electronic device 500 may be implemented as the HMD device. However, the electronic device 500 is not limited thereto. For example, the electronic device 500 may be implemented as a cellular phone, a video phone, a smart pad, a smart watch, a tablet PC, a car navigation system, a television, a computer monitor, a laptop, etc.

The processor 510 may perform various computing functions. The processor 510 may be a micro processor, a central processing unit (CPU), an application processor (AP), etc. The processor 510 may be coupled to other components via an address bus, a control bus, a data bus, etc. Further, the processor 510 may be coupled to an extended bus such as a peripheral component interconnection (PCI) bus. The memory device 520 may store data for operations of the electronic device 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 530 may be a solid state drive (SSD) device, a hard disk drive (HDD) device, a CD-ROM device, etc. The I/O device 540 may be an input device such as a keyboard, a keypad, a mouse device, a touchpad, a touch-screen, etc, and an output device such as a printer, a speaker, etc. In some exemplary embodiments, the liquid crystal display device 560 may be included in the I/O device 540. The power supply 550 may provide power for operations of the electronic device 500.

The liquid crystal display device 560 may be coupled to other components via the buses or other communication links. Specifically, the liquid crystal display device 560 may include a source device and a sink device that perform data communication using a given interface. The source device may output image data to the sink device. The sink device may receive the image data from the source device and may perform a displaying operation based on the image data. While a displaying operation is performed, the source device may change a frame rate of an image frame composing the image data, and the sink device may change a frame rate of a panel driving frame for the displaying operation by adjusting a vertical blank period of the panel driving frame as the frame rate of the image frame is changed. Here, the sink device may not change an active period of the panel driving frame (i.e., may keep the active period of the panel driving frame constant) when changing the frame rate of the panel driving frame. As described above, the liquid crystal display device 560 may prevent a flicker that a viewer would otherwise perceive by reducing (or, minimizing) deviation of average luminance of the panel driving frames. To this end, the sink device may adjust a common voltage applied to a display panel included in the sink device when changing the frame rate of the panel driving frame. In an exemplary embodiment, the sink device may linearly adjust the common voltage applied to the display panel. For example, the sink device may linearly reduce the common voltage applied to the display panel when a pixel voltage applied to the display panel has a positive polarity and may linearly increase the common voltage applied to the display panel when the pixel voltage applied to the display panel has a negative polarity. In another exemplary embodiment, the sink device may non-linearly adjust the common voltage applied to the display panel. For example, the sink device may non-linearly reduce the common voltage applied to the display panel when the pixel voltage applied to the display panel has a positive polarity and may non-linearly increase the common voltage applied to the display panel when the pixel voltage applied to the display panel has a negative polarity. In exemplary embodiments, the sink device may reset the common voltage applied to the display panel to have the same reference voltage level at a starting point of each panel driving frame and may start to adjust the common voltage at the starting point of each panel driving frame or at a point where a predetermined time elapses from the starting point of each panel driving frame. Since the display device 560 is exemplified as the liquid crystal display device 100 described above, duplicate description related thereto is omitted.

The present inventive concept may be applied to a liquid crystal display device and an electronic device including the liquid crystal display device. For example, the present inventive concept may be applied to a cellular phone, a smart phone, a video phone, a smart pad, a smart watch, a tablet PC, a car navigation system, a television, a computer monitor, a laptop, a digital camera, an HMD device, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display device comprising:
   a source device configured to output image data of a plurality of frames; and
   a sink device configured to perform a displaying operation based on the image data, wherein,
source device changes a frame rate of an image frame composing the image data while the displaying operation is performed,
the sink device changes a frame rate of a panel driving frame for the displaying operation by adjusting a vertical blank period of the panel driving frame as the frame rate of the image frame is changed,
the sink device gradually adjusts a power supply voltage applied to a display panel included in the sink device throughout a majority portion of an active period of the panel driving frame and/or a majority portion of the vertical blank period of the panel driving frame, during a display operation of a corresponding individual frame, in accordance with the frame rate of the panel driving frame, and
the sink device resets the power supply voltage to have a same reference voltage level at a starting point of consecutive panel driving frames.

2. The display device of claim 1, wherein an active period of the panel driving frame is maintained at a constant length from a first frame to a second frame when the frame rate of the panel driving frame is changed from the first frame to the second frame.

3. The display device of claim 1, wherein the sink device changes the frame rate of the panel driving frame to have the same value as the frame rate of the image frame.

4. The display device of claim 3, wherein the sink device increases the frame rate of the panel driving frame by reducing the vertical blank period of the panel driving frame when the source device increases the frame rate of the image frame.

5. The display device of claim 3, wherein the sink device decreases the frame rate of the panel driving frame by increasing the vertical blank period of the panel driving frame when the source device decreases the frame rate of the image frame.

6. The display device of claim 1, wherein the sink device adjusts the power supply voltage gradually throughout a majority portion of the active period of the panel driving frame.

7. The display device of claim 1, wherein the sink device starts to adjust the power supply voltage at the starting point of the panel driving frame.

8. The display device of claim 1, wherein the sink device gradually adjusts the power supply voltage throughout a majority portion of the vertical blank period of the panel driving frame.

9. The display device of claim 1, wherein the sink device gradually adjusts the power supply voltage throughout an entirety of the panel driving frame.

10. A sink device comprising:
a display panel configured to display image frames based on image data in a displaying operation; and
a display panel driving circuit configured to:
receive the image data from a source device and to drive the display panel;
change a frame rate of a panel driving frame for the displaying operation by adjusting a vertical blank period of the panel driving frame,
gradually adjust a power supply voltage applied to the display panel throughout a majority portion of an active period of the panel driving frame and/or a majority portion of the vertical blank period of the panel driving frame during a display operation of a corresponding individual frame, and
reset the power supply voltage to have a same reference voltage level at a starting point of consecutive panel driving frames.

11. The sink device of claim 10, wherein the display panel driving circuit changes the frame rate of the panel driving frame to have the same value as a frame rate of a frame of the image data which is output by the source device.

12. The sink device of claim 10, wherein the display panel driving circuit gradually adjusts the power supply voltage during at least a majority portion of the active period of the panel driving frame.

13. The sink device of claim 10, wherein the display panel driving circuit starts to adjust the power supply voltage at the starting point of the panel driving frame.

14. The sink device of claim 10, wherein the display panel driving circuit gradually adjusts the power supply voltage throughout a majority portion of the vertical blank period of the panel driving frame.

15. The sink device of claim 10, wherein the display panel driving circuit gradually adjusts the power supply voltage throughout an entirety of the panel driving frame.

* * * * *